(12) United States Patent
Chong et al.

(10) Patent No.: US 7,822,877 B2
(45) Date of Patent: Oct. 26, 2010

(54) NETWORK PROCESSOR INTEGRATED CIRCUIT WITH A SOFTWARE PROGRAMMABLE SEARCH ENGINE COMMUNICATIONS MODULE

(75) Inventors: Simon Chong, Fremont, CA (US); Steven Pan, Santa Clara, CA (US)

(73) Assignee: Bay Microsystems, Inc., San Jose, CA (US)

( * ) Notice: Subject to any disclaimer, the term of this patent is extended or adjusted under 35 U.S.C. 154(b) by 0 days.

(21) Appl. No.: 11/945,930

(22) Filed: Nov. 27, 2007

(65) Prior Publication Data
US 2008/0126321 A1    May 29, 2008

Related U.S. Application Data

(60) Provisional application No. 60/861,176, filed on Nov. 27, 2006.

(51) Int. Cl.
*G06F 15/173* (2006.01)
(52) U.S. Cl. ...................................................... 709/250
(58) Field of Classification Search ................. 709/250, 709/249, 230
See application file for complete search history.

(56) References Cited

U.S. PATENT DOCUMENTS

| | | | |
|---|---|---|---|
| 5,615,344 A * | 3/1997 | Corder ........................ 710/62 |
| 5,893,089 A * | 4/1999 | Kikinis ........................... 707/3 |
| 5,914,976 A * | 6/1999 | Jayaraman et al. ........ 372/50.21 |
| 6,741,591 B1 | 5/2004 | Kaldani et al. |
| 6,798,778 B1 | 9/2004 | Bergantino et al. |
| 6,823,397 B2 * | 11/2004 | Rawson, III ................. 709/250 |
| 6,845,099 B2 | 1/2005 | Bergantino et al. |
| 6,920,554 B2 * | 7/2005 | Rawson, III ................. 713/100 |
| 7,366,001 B2 * | 4/2008 | Hanzawa et al. ........... 365/49.1 |
| 7,613,902 B1 * | 11/2009 | Martin et al. ................ 712/201 |

OTHER PUBLICATIONS

Harmeet Bhugra, "LA-1: Look-Aside Processor Interface and Applications", Apr. 2004, p. 1-3.

* cited by examiner

*Primary Examiner*—David Y Eng

(57) ABSTRACT

A network processor IC for processing network traffic includes a bus interface and a software programmable search engine communications module. The bus interface of the network processor IC is not specific to a particular search engine and the software programmable search engine communications module enables communications to be conducted between the network processor IC and the search engine via the bus interface according to whatever communications protocol the search engine requires. Using the software programmable search engine communications module, a network processor IC is software programmed to communicate with a particular search engine in a manner that is completely compatible with the search engine.

10 Claims, 6 Drawing Sheets

NETWORK PROCESSOR INTEGRATED CIRCUIT WITH A SOFTWARE PROGRAMMABLE SEARCH ENGINE COMMUNICATIONS MODULE

CROSS-REFERENCE TO RELATED APPLICATIONS

This application is entitled to the benefit of provisional U.S. Patent Application Ser. No. 60/861,176, filed Nov. 27, 2006, the disclosure of which is incorporated by reference herein in its entirety.

FIELD OF THE INVENTION

The invention relates generally to chip-to-chip interfaces, and more particularly, to interfaces between a network processor integrated circuit (IC) and an external search engine.

BACKGROUND OF THE INVENTION

As bandwidth requirements for information networks increase, specialized processors, referred to as network processors, are being designed specifically to process packetized network traffic. Network processors often utilize external search engines to perform operations such as packet classification. External search engines utilize specialized search memories such as content addressable memory (CAM) or synchronous random access memory (SRAM) to perform high speed searches based on packet header information. The communications between a network processor and an external search engine typically occur over a dedicated communications bus. Different vendors of external search engines have developed various different interfaces for communicating with their particular search engine. The search engine-specific interfaces may differ in the number of pins and/or the details of the communications protocol, e.g., pin usage, instruction sets, signaling protocols, etc.

Because there are various different search engines that can be used with a network processor, each with its own search engine-specific interface, it can be difficult to ensure that a network processor is compatible with a particular search engine. One approach to providing compatible communications between a network processor and an external search engine involves placing a field programmable gate array (FPGA) integrated circuit (IC) between the network processor and the search engine. The FPGA IC is configured to convert request communications from the network processor into a format that is compatible with the search engine and to convert reply communications from the search engine into a format that is compatible with the network processor. Although this "glue logic" approach works well to bridge communications between a network processor and a search engine, the approach requires an extra IC and the programmability of the FPGA IC is limited to the capabilities of certain pre-established hardware-based logic blocks.

Additionally, at least one standard interface, referred to as the Look-Aside Interface (LA-1), has been developed to provide a standard interface between network processors and external devices such as search engines. Although the LA-1 standard provides a standard interface between network processors and external devices such as search engines, the LA-1 standard was established to support throughput of up to 10 Gbps. Next generation networks are pushing beyond 10 Gbps to levels that are difficult to support using LA-1 compliant interfaces.

SUMMARY OF THE INVENTION

A network processor IC for processing network traffic includes a bus interface and a software programmable search engine communications module. The bus interface of the network processor IC is not specific to a particular search engine, e.g., the exact number of pins of the bus interface is not dictated by the number pins of a particular search engine and the software programmable search engine communications module enables communications to be conducted between the network processor IC and the search engine via the bus interface according to whatever communications protocol the search engine requires. Using the software programmable search engine communications module, a network processor IC is software programmed to communicate with a particular search engine in a manner that is completely compatible with the search engine. Because the network processor IC includes an on-chip software programmable search engine communications module, there is no need for an additional IC between the network processor IC and the search engine. Additionally, the network processor IC can be software programmed to adapt to different search engines that have different communications interfaces, including future interfaces that have not yet been developed.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
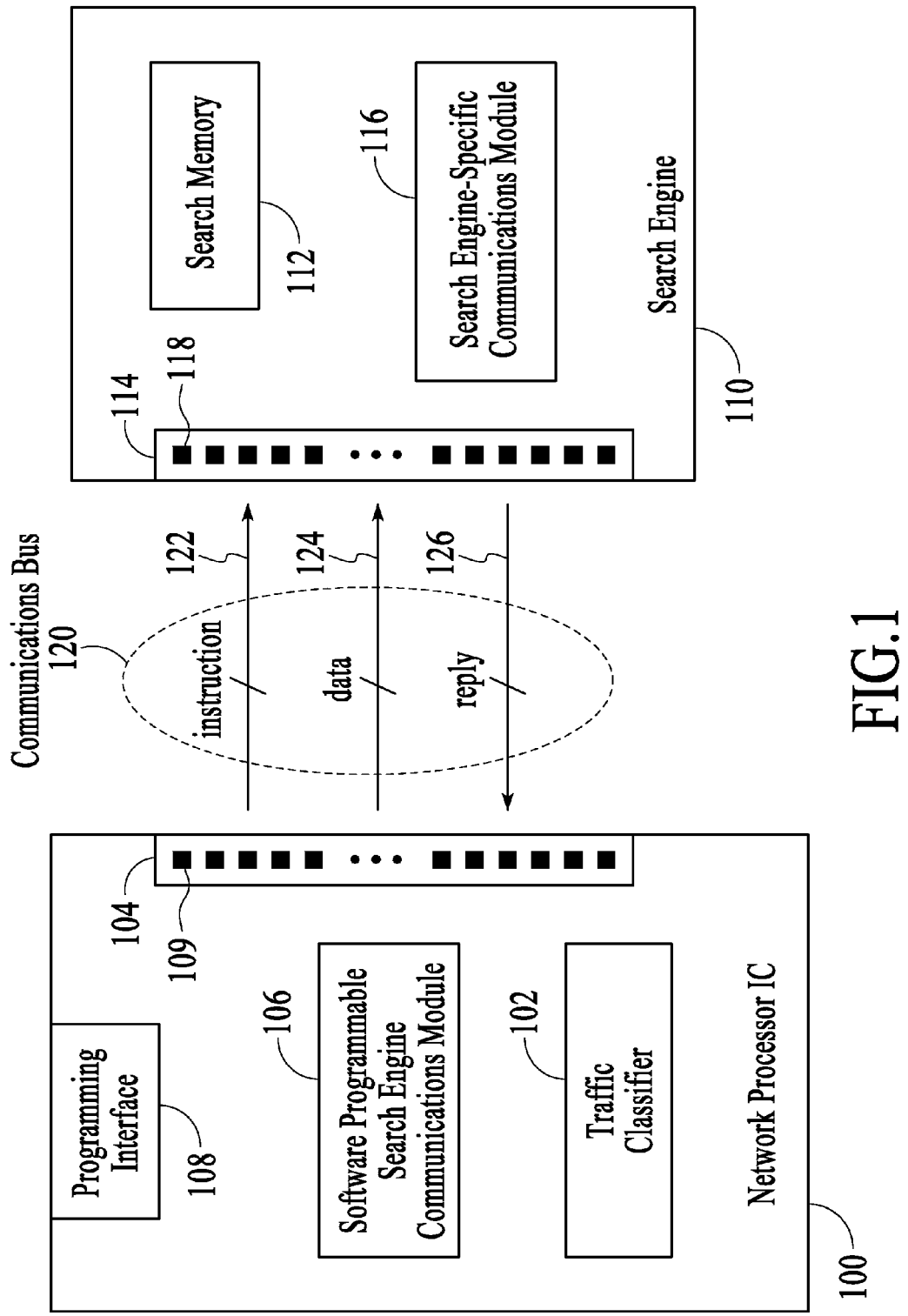
FIG. 1 depicts a network processor IC and a search engine that are connected by a communications bus.

FIG. 1 depicts a network processor IC 100 and a search engine 110 that are connected by a communications bus 120. Referring first to the search engine, the search engine includes a search memory 112, a bus interface 114, and a search engine-specific communications module 116. The search memory may be, for example, a CAM, a tertiary CAM (TCAM), or a RAM such as an SRAM or a dynamic RAM (DRAM). The search memory is populated via the network processor IC and is searched using search keys. In traffic classification operations, a search key is typically an n-bit vector that is derived by the network processor IC from packet header information. For example, the search key may be a portion or portions of a packet header or a value derived from a hash function of a portion or portions of a packet header.

The bus interface 114 of the search engine 110 includes a series of pins 118, or pads, that are used to provide electrical connections to the network processor IC 100. The bus interface of the search engine in FIG. 1 includes pins 1 to m, where m is a value that is specific to the search engine. For example, conventional search engines may have from 122-130 pins.

The search engine-specific communications module 116 of the search engine 110 enables communications between the search engine and the network processor IC 100 via a communications protocol that is specific to the search engine. In the embodiment of FIG. 1, the search engine-specific communications protocol specifies a request protocol for communications from the network processor IC to the search engine and a reply protocol for communications from the search engine to the network processor IC. The request and reply protocols define criteria such as the pin usage, the instruction set, the data format, etc. The search engine-specific communications protocols of many search engines are proprietary protocols that are different from vendor to vendor and even from product to product of the same vendor.

The network processor IC 100 and the search engine 110 are connected to each other by the communications bus 120. The communications bus is a series of electrical signal paths that connect bus pins on the network processor IC to bus pins on the search engine. In the embodiment of FIG. 1, the communications bus includes an instruction bus 122, a data bus 124, and a reply bus 126. The instruction bus is used to communicate instructions from the network processor IC to the search engine, the data bus is used to communicate data (e.g., search keys and search entries) from the network processor IC to the search engine, and the reply bus is used to communicate reply information (e.g., indexes/handles) from the search engine to the network processor IC. The width of each bus is implementation specific. Typically, a bus width is expressed in terms of bits, where each bit represents one pin on the network processor IC and one pin on the search engine that are electrically connected. In an embodiment, the instruction bus is 22 bits wide and the reply bus is 28 bits wide although different bus widths are possible. Various conventional search engines have a data bus that is either 72-bits or 80-bits wide although different bus widths are possible. A data bus of 72-bits is typically used to communicate 72, 144, and 288-bit search keys and a data bus of 80-bits is typically used to communicate 80, 160, and 320-bit search keys.

Referring now to the network processor IC 100, the network processor IC includes among other things a traffic classifier 102, a search engine-independent bus interface 104, a software programmable search engine communications module 106, and a programming interface 108. The traffic classifier classifies incoming packets of traffic based on information related to the packet, including, for example, input port and header information. In an embodiment, the traffic classifier parses packet headers and generates search keys from the parsed header information. The search keys are provided to the search engine. Classification operations that utilize an external search engine are known in the field and are not described in more detail herein.

The search engine-independent bus interface 104 of the network processor IC 100 includes a series of pins 109, or pads, that are used to provide electrical connections to the search engine 110. The search engine-independent interface depicted in FIG. 1 includes pins 1 to p, where the value of p can be different for different network processor designs. In an embodiment, the network processor IC includes 130 pins for interfacing with a search engine although the specific number of pins for the search engine-independent bus interface is implementation specific. The network processor IC also includes other pins for other interfaces that are not described herein. The bus interface is referred to as "search engine-independent" because the number of pins of the bus interface is not necessarily dictated by the number of pins of a particular search engine. As is described in more detail below, the network processor IC can have a bus interface with a different number of pins than the number of pins of the search engine bus interface.

The programming interface 108 is a communications interface that enables programming instructions to be received into the network processor IC 100 from an external source. In an embodiment, the programming interface is a bidirectional high-bandwidth, low-latency point-to-point link that is packet-based such as an interface based on HYPERTRANSPORT technology.

In accordance with an embodiment of the invention, the software programmable search engine communications module 106 is a hardware-based module that enables communications between the network processor IC 100 and the search engine 110. Communications from the network processor IC to the search engine include, for example, search instructions, search keys, search entry read/write instructions, and register read/write instructions. Communications from the search engine to the network processor IC include, for example, search results (e.g., index/handle) and read data. In the embodiment of FIG. 1, the software programmable search engine communications module is embodied in programmable hardware circuits such as programmable logic that is programmed via a set of registers in response to programming instructions received through the programming interface 108. The programmable logic may include programmable logic gates. In an embodiment, the programmable logic includes multiple multiplexers that are controlled by registers. The registers can be set via the programming interface. In an alternative embodiment, the programmable logic may include devices such as programmable array logic, generic array logic, complex programmable logic devices, and field programmable gate arrays. In an embodiment, the network processor IC includes some circuits that perform fixed functions such as executing instructions, and other circuits whose function can be altered by programming instructions that are executed by the fixed function circuits.

In an embodiment, the software programming of the software programmable search engine communications module 106 involves first identifying a communications protocol of a search engine 110 that is to be used with the network processor IC 100. In particular, the number of pins, pin usage, instruction set and signaling protocol of the search engine-specific communications protocol are identified. Once details of the search engine-specific communications protocol are identified, the network processor IC receives, via the programming interface, computer readable instructions that program the software programmable search engine communications module to communicate with the search engine according to the requirements of the search engine. In particular, the computer readable instructions identify, for example, which pins of the network processor IC's bus interface are to be used, how the instruction, data, and reply buses are to be assigned among the pins, and how to use the instruction set of the search engine. Once the network processor IC has received and processed the computer readable instructions, the software programmable search engine communications module is programmed and ready to communicate with the search engine.

The software programmable search engine communications module 106 enables the network processor IC 100 to be software programmed to communicate with a particular search engine in a manner that is completely compatible with the search engine. Because the network processor IC includes an on-chip software programmable search engine communications module, there is no need for an additional IC between the network processor IC and the search engine. Additionally, the network processor IC can be software programmed to adapt to different search engines that have different communications interfaces, including future interfaces that have not yet been developed.

In an embodiment, the software programmable search engine communications module 106 is programmed so that the network processor IC 100 is able to generate instructions and data that are compatible with the search engine-specific communications protocol 116 and so that the network processor IC is able to receive and process replies from the search engine 110. With regard to the instruction bus 122, the network processor IC is software programmed so that each transaction between the network processor IC and the search engine utilizes the instruction set that is dictated by the search engine-specific communications protocol. Additionally, the network processor IC is software programmed so that the instructions are distributed on the instruction bus as dictated by the search engine-specific communications protocol.

With regard to the reply bus 126, search engines typically return the address or handle of a matched entry along with an associated "HIT" signal. The address or handle identifies which entry in the search memory is matched, or HIT, with the input search key. In an embodiment, the software programmable search engine communications module is programmed so that if the HIT is not asserted, or nothing is matched, the returned address will be ignored. The HIT signal may be ignored since software can always program the search memory to have at least one entry hit.

Search memories within different search engines may have different sizes of entry addresses. Additionally, search memories can be cascaded to form a larger search table. In an embodiment, the software programmable search engine communications module is software programmed to adapt to the size of the search memory.

In an embodiment, search engines return a result for each transaction request. The latency of the valid return can be different for different search engines. Some search engines return a result with a fixed delay, but other search engines return a result with a "VALID" signal. In accordance with an embodiment of the invention, the software programmable search engine communications module can be software programmed so that the network processor IC expects a "VALID" signal or a programmable fixed delay for a valid return, checks the HIT signal or ignores the HIT signal, and/or checks the VALID signal and the HIT signal as active high or active low signals.

The reply bus 126 between the network processor IC 100 and the search engine 110 can be entirely configured via the software programmable search engine communications module 106. In an embodiment, the network processor IC reserves a group of pins for the reply bus and specifies the location of the VALID and HIT signals within the replay bus.

Figure 2:
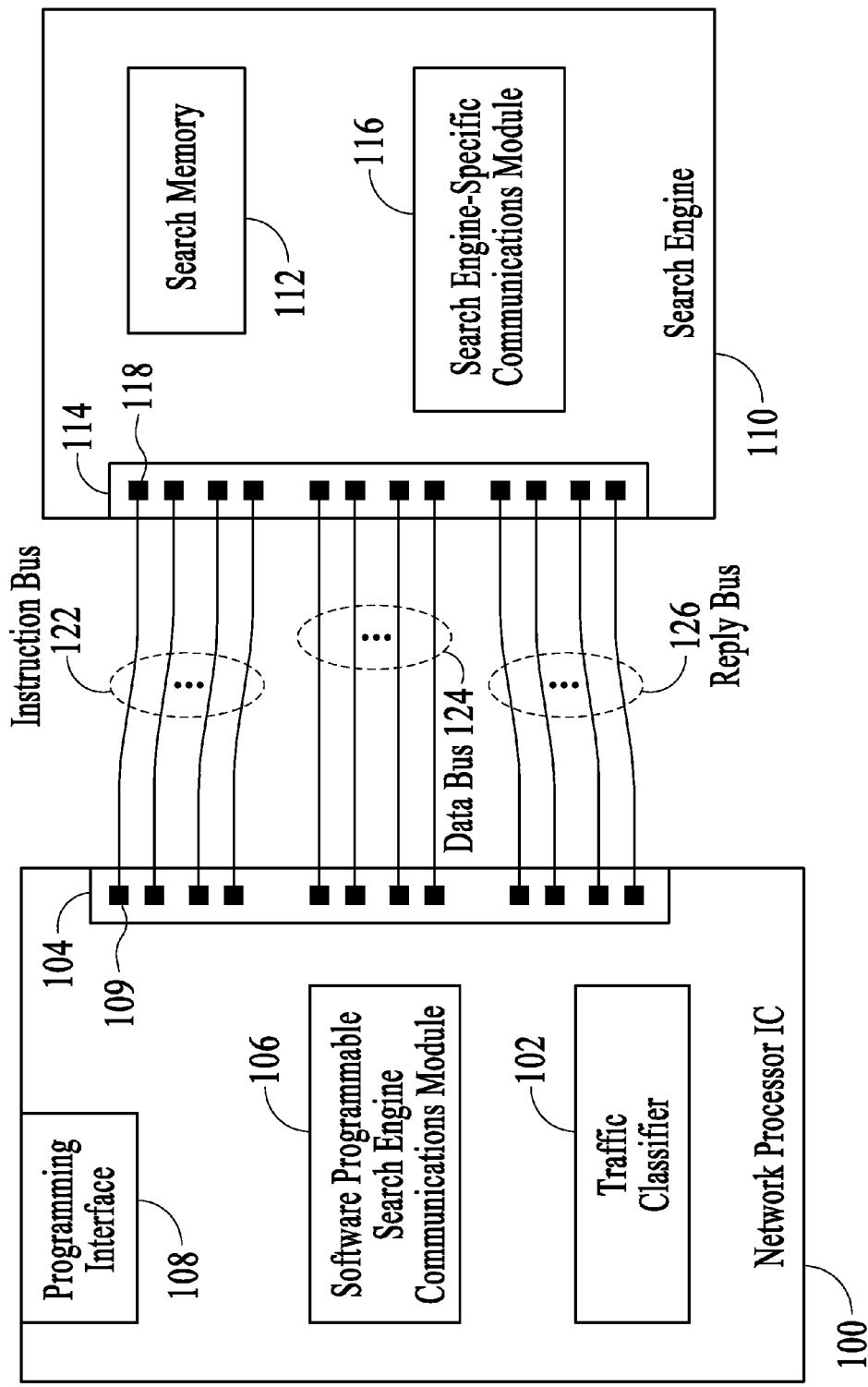
FIG. 2 illustrates a case in which the number of pins of a network processor IC's bus interface matches the number of pins of a search engine's bus interface.

As described above, the software programmable search engine communications module 106 of the network processor IC 100 enables the network processor to be programmed to enable communications according to the communications protocol of the search engine 110. The network processor IC can be adapted to the search engine whether or not the bus interface of the network processor IC has the same number of pins as the bus interface of the search engine. FIG. 2 illustrates a case in which the number of pins, p, of the network processor IC's bus interface 104 matches the number of pins, m, of the search engine's bus interface 114. In this case, the software programmable search engine communications module is programmed to utilize all of its pins as dictated by the search engine-specific communications protocol.

Figure 3:
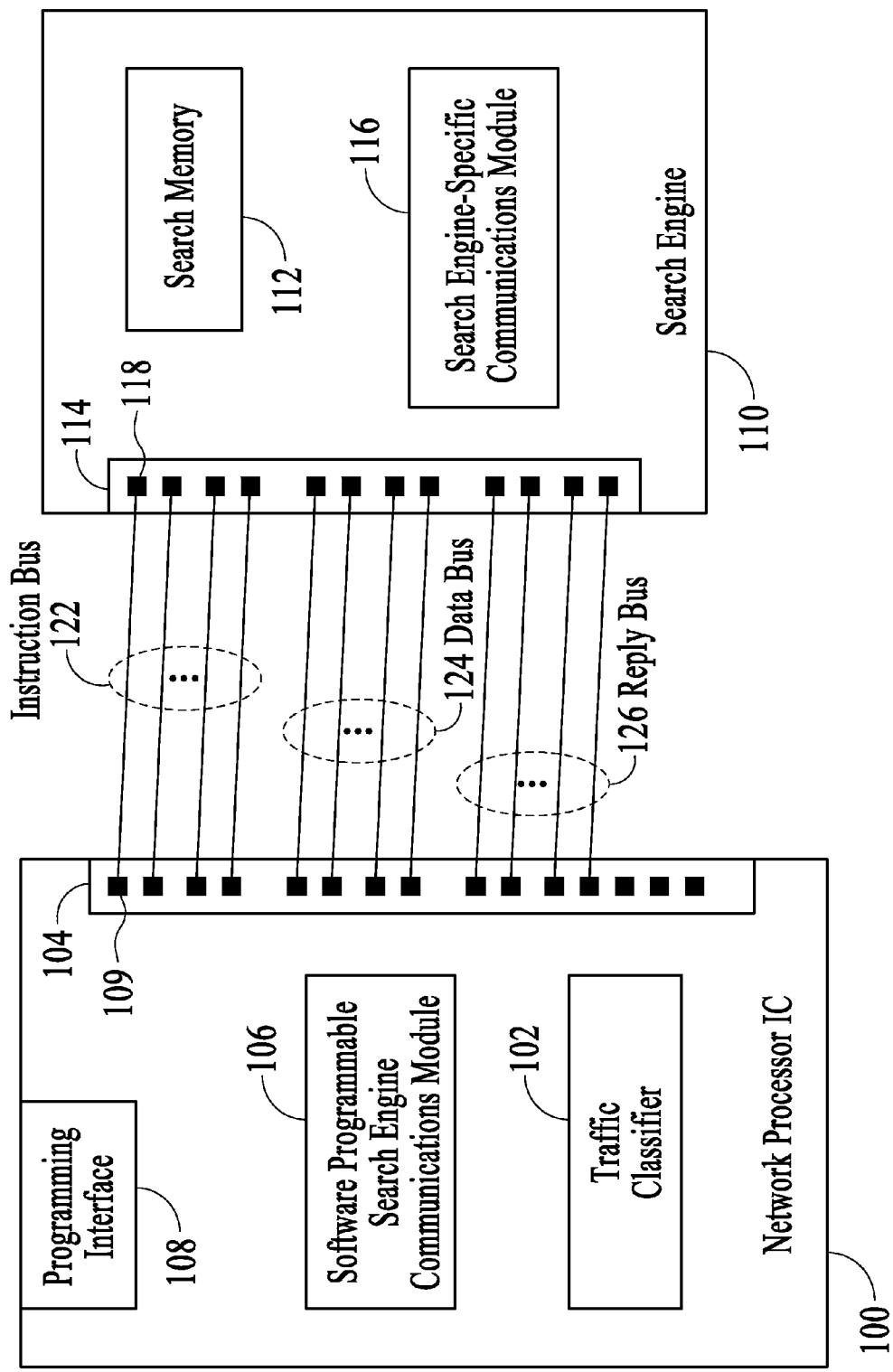
FIG. 3 illustrates a case in which a network processor IC has more pins in its bus interface than a corresponding search engine.

Although in the case of FIG. 2 the network processor IC 100 and the search engine 110 have the same number of pins, in other cases the network processor IC and the search engine may have different numbers of pins. FIG. 3 illustrates the case in which the network processor IC has more pins in its bus interface than the search engine. In this case, the software programmable search engine communications module 106 is programmed to utilize those pins of the network processor IC's bus interface which are connected to the search engine according to the search engine-specific communications protocol 116.

A Double Data Rate (DDR) or a Single Data Rate (SDR) protocol may be used to communicate between the network processor IC and the search engine. The software programmable search engine communications module is programmed to use whichever protocol is required by the search engine. DDR uses both the rising edge and the falling edge of a clock signal to communicate data. SDR only uses one edge of the clock signal to communicate data. Two software instruction sets are needed for DDR, one for the rising edge of the clock signal and one for the falling edge of the clock signal. To support SDR, the software programmable search engine communications module is programmed to set the instructions on both edges to the same value.

Figure 4:
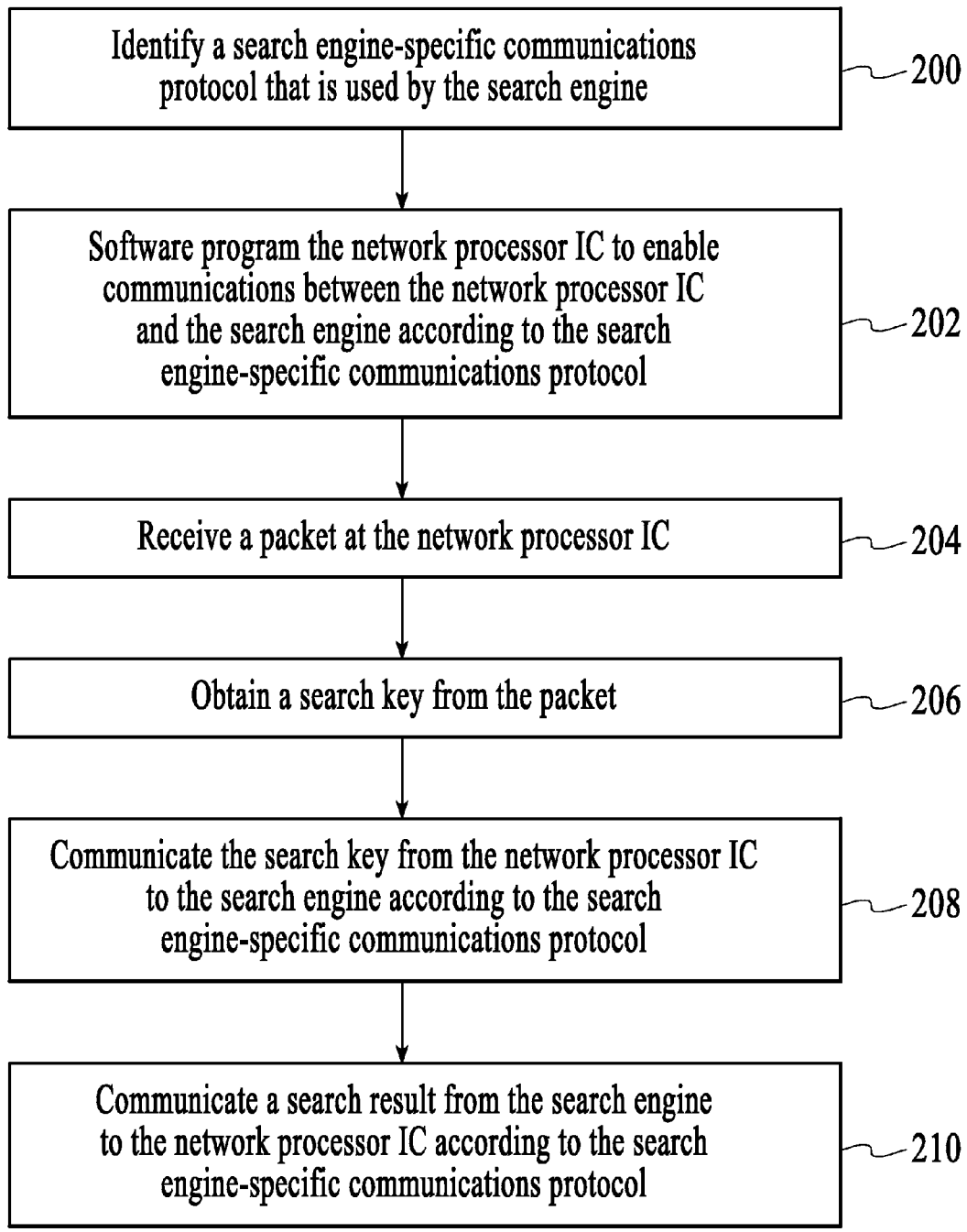
FIG. 4 is a process flow diagram of a method for utilizing a search engine that is external to a network processor IC.

FIG. 4 is a process flow diagram of a method for utilizing a search engine that is external to a network processor IC. At block 200, a search engine-specific communications protocol that is used by the search engine is identified. At block 202, the network processor IC is software programmed to enable communications between the network processor IC and the search engine according to the search engine-specific communications protocol. At block 204, a packet at the network processor IC is received. At block 206, a search key from the packet is obtained. At block 208, the search key is communicated from the network processor IC to the search engine according to the search engine-specific communications protocol. At block 210, a search result is communicated from the search engine to the network processor IC according to the search engine-specific communications protocol.

Figure 5:
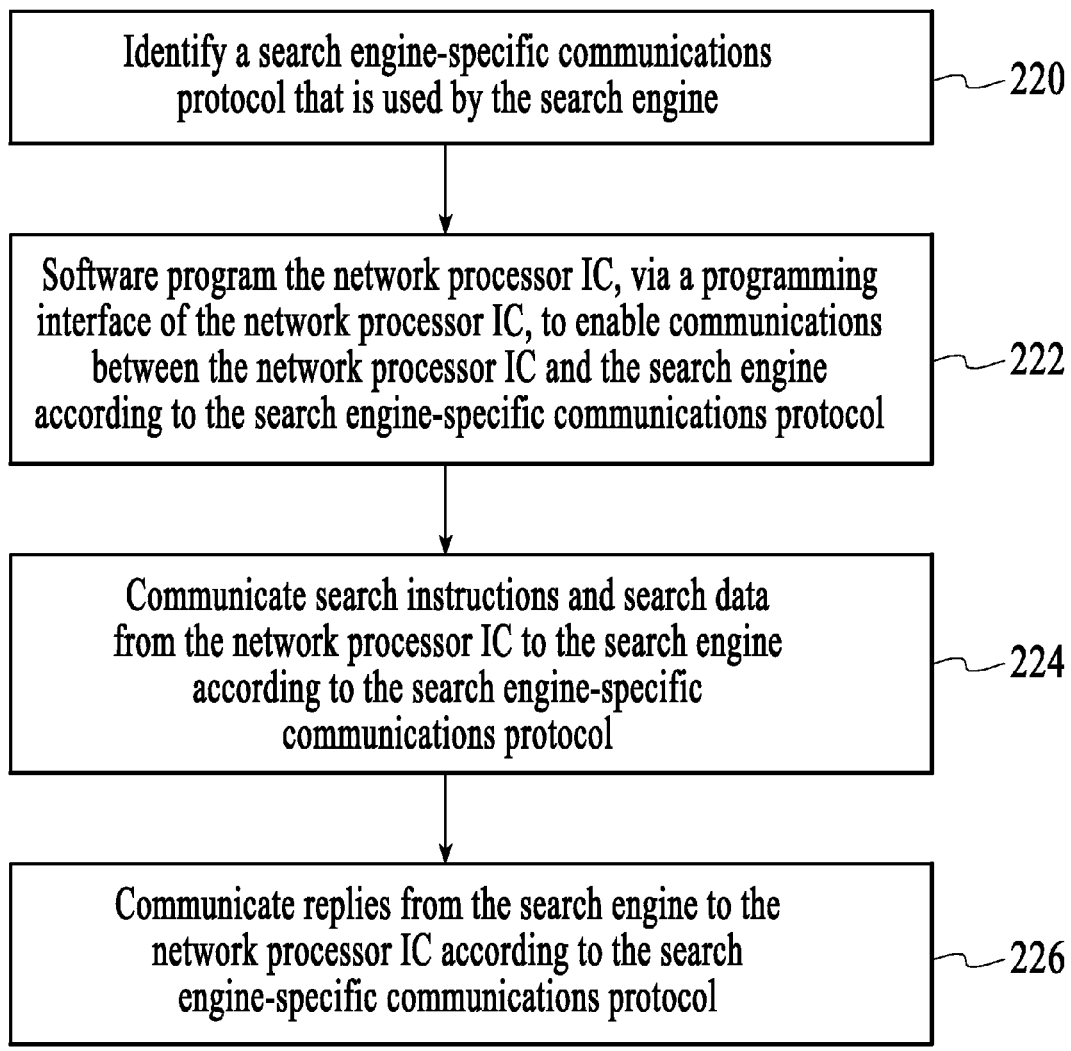
FIG. 5 is a process flow diagram of another method for utilizing a search engine that is external to a network processor IC.

FIG. 5 is a process flow diagram of another method for utilizing a search engine that is external to a network processor IC. At block 220, a search engine-specific communications protocol that is used by the search engine is identified. At block 222, the network processor IC is software programmed, via a programming interface of the network processor IC, to enable communications between the network processor IC and the search engine according to the search engine-specific communications protocol. At block 224, search instructions and search data are communicated from the network processor IC to the search engine according to the search engine-specific communications protocol. At block 226, replies are communicated from the search engine to the network processor IC according to the search engine-specific communications protocol.

Figure 6:
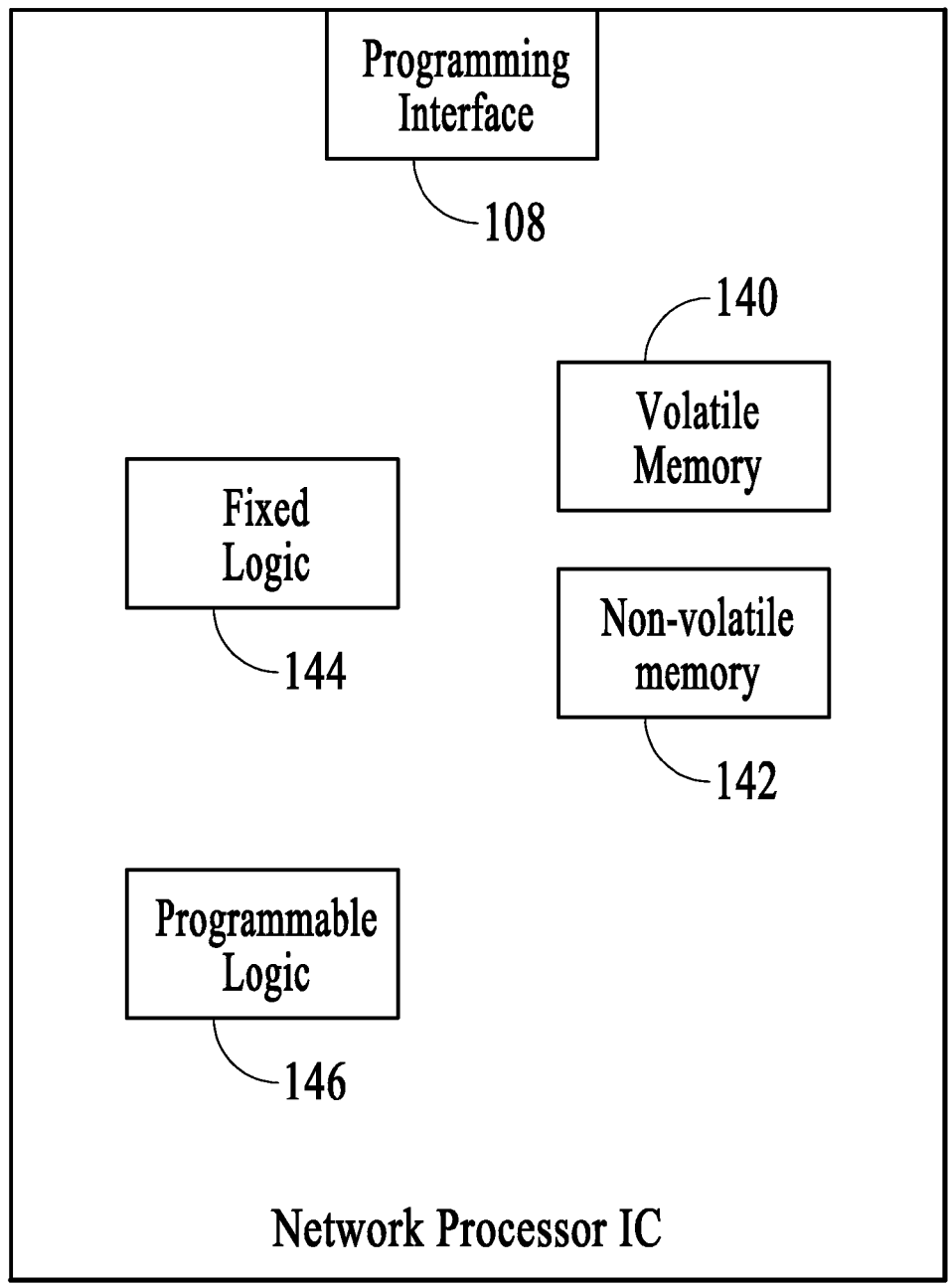
FIG. 6 is a functional block diagram of a network processor IC.

FIG. 6 is a functional block diagram of a network processor IC 100. The network processor IC includes a programming interface 108, volatile memory 140, non-volatile memory 142, fixed logic 144, and programmable logic 146. The programming interface is described above with reference to FIG. 1. The volatile memory is memory such as RAM that is used to store instructions and data within the network processor IC. The non-volatile memory is memory such as read only memory (ROM) and FLASH memory. The fixed logic includes various function-specific logic blocks such as, for example, a memory interface, an instruction fetcher, and an instruction decoder. The fixed logic is able to, among other operations, execute software instructions. The programmable logic includes programmable hardware circuits such as programmable logic gates. Programming interfaces, volatile memory, non-volatile memory, fixed logic, and programmable logic are known in the field of central processing units and network processor ICs. In an embodiment of the invention, the software programmable search engine communications module is embodied in the programmable logic once it has been programmed. As described above, the programmable logic is programmed in response to programming instructions that are received via the programming interface and executed by the fixed logic.

In an embodiment, the programming instructions, which are used to program the software programmable search engine communications module, are generated by a computer engineer with knowledge of the network processor IC and the communications protocol of the search engine.

Although specific embodiments of the invention have been described and illustrated, the invention is not to be limited to the specific forms or arrangements of parts as described and illustrated herein. The invention is limited only by the claims.

What is claimed is:

1. A network processor integrated circuit (IC) for processing network traffic, the network processor IC comprising:
   a search engine-independent bus interface within the network processor IC for connecting to a search engine that is external to the network processor IC and includes a search memory, wherein the search engine utilizes a search engine-specific communications protocol;
   a software programmable search engine communications module within the network processor IC configured to enable communications between the network processor IC and the search engine via the search engine-independent bus interface according to the search engine-specific communications protocol;
   a programming interface for receiving computer readable instructions for programming the software programmable search engine communications module; and
   a traffic classifier for generating search keys that are provided to the search engine via the software programmable search engine communications module;
   wherein the software programmable search engine communications module comprises programmable hardware circuits, which when programmed in response to the computer readable instructions:
   cause the network processor IC to communicate with the search engine according to the search engine-specific communications protocol, including using a search engine-specific instruction set; and
   assign pins of the search engine-independent bus interface to an instruction bus, a data bus, and a reply bus;
   wherein;
      the pins assigned to the instruction bus are used to communicate search instructions from the network processor IC to the search engine;
      the pins assigned to the data bus are used to communicate the search keys and search entries from the network processor IC to the search engine; and
      the pins assigned to the reply bus are used to communicate indexes or handles from the search engine to the network processor IC.

2. The network processor IC of claim 1 wherein the number of pins of the search engine-independent bus interface is different from the number of pins of the search engine.

3. The network processor IC of claim 1 wherein the search memory is content addressable memory (CAM).

4. The network processor IC of claim 1 wherein the software programmable search engine communications module is programmed to use the search engine-specific instruction set.

5. A method for utilizing a search engine that is external to a network processor integrated circuit (IC), the method comprising:
   identifying a search engine-specific communications protocol that is used by the search engine;
   software programming the network processor IC to enable communications between the network processor IC and the search engine according to the search engine-specific communications protocol, wherein software programming the network processor IC comprises providing software programming instructions to the network processor IC through a programming interface of the network processor IC, programming hardware programmable circuits of the network processor IC, and assigning pins of a search engine-independent bus interface of the network processor IC to an instruction bus, a data bus, and a reply bus, wherein;
      the pins assigned to the instruction bus are used to communicate search instructions from the network processor IC to the search engine;
      the pins assigned to the data bus are used to communicate the search keys and search entries from the network processor IC to the search engine; and
      the pins assigned to the reply bus are used to communicate indexes or handles from the search engine to the network processor IC;
   receiving a packet at the network processor IC;
   obtaining a search key from the packet;
   communicating the search key from the network processor IC to the search engine according to the search engine-specific communications protocol; and
   communicating a search result from the search engine to the network processor IC according to the search engine-specific communications protocol;
   wherein the search engine-specific communications protocol comprises a search engine-specific instruction set and wherein communicating the search key from the network processor IC to the search engine comprises communicating at least one instruction from the search engine-specific instruction set.

6. The method of claim 5 wherein the software programming comprises specifying the pin locations of a VALID signal and a HIT signal within the reply bus of the search engine-independent bus interface.

7. The method of claim 5 wherein the software programming comprises programming the software programmable search engine communications module so that the network processor IC expects a search result to be received either with a VALID signal or at a fixed delay.

8. A system comprising:
   a network processor integrated circuit (IC) for processing network traffic;
   a search engine that is external to the network processor IC, the search engine having a search memory and a search engine-specific communications module that utilizes a search engine-specific communications protocol; and
   a communications bus that connects the network processor IC to the search engine;
   the network processor IC comprising:
   a traffic classifier for generating search keys that are provided to the search engine via the communications bus;

a search engine-independent bus interface within the network processor IC, the search engine-independent bus interface including pins for connecting to the communications bus;

a software programmable search engine communications module within the network processor IC configured to enable communications between the network processor IC and the search engine via the search engine-independent bus interface according to the search engine-specific communications protocol, wherein the software programmable search engine communications module comprises programmable hardware circuits, which when programmed in response to computer readable instructions:

cause the network processor IC to communicate according to the search engine-specific communications protocol, including using a search engine-specific instruction set; and assign pins of the search engine-independent bus interface to an instruction bus, a data bus, and a reply bus;

wherein;

the pins assigned to the instruction bus are used to communicate search instructions from the network processor IC to the search engine;

the pins assigned to the data bus are used to communicate the search keys and search entries from the network processor IC to the search engine; and the pins assigned to the reply bus are used to communicate indexes or handles from the search engine to the network processor IC;

a programming interface configured to receive computer readable instructions for programming the software programmable search engine communications module.

9. The network processor IC of claim 8 wherein the search engine includes a bus interface that includes pins and wherein the number of pins of the search engine-independent bus interface is different from the number of pins of the search engine.

10. The network processor IC of claim 8 wherein the software programmable search engine communications module is programmed to use the search engine-specific instruction set.

* * * * *